United States Patent
Millon et al.

(10) Patent No.: US 10,654,484 B2
(45) Date of Patent: May 19, 2020

(54) COLD-WEATHER STARTING STRATEGY USING AN ALTERNATOR-STARTER IN A VEHICLE HAVING A BELT DRIVEN BY AN INTERNAL COMBUSTION ENGINE

(71) Applicant: NISSAN MOTOR CO., LTD., Yokohama-shi, Kanagawa (JP)

(72) Inventors: Jean-Pierre Millon, Bailly (FR); Jean-Yves Der Matheossian, Paris (FR)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 27 days.

(21) Appl. No.: 16/082,428

(22) PCT Filed: Mar. 23, 2017

(86) PCT No.: PCT/FR2017/050674
§ 371 (c)(1),
(2) Date: Sep. 5, 2018

(87) PCT Pub. No.: WO2017/168075
PCT Pub. Date: Oct. 5, 2017

(65) Prior Publication Data
US 2019/0077405 A1    Mar. 14, 2019

(30) Foreign Application Priority Data
Mar. 30, 2016    (FR) .................................... 16 52750

(51) Int. Cl.
*B60W 30/194* (2012.01)
*F02N 11/04* (2006.01)
(Continued)

(52) U.S. Cl.
CPC ............ *B60W 30/194* (2013.01); *F02B 67/06* (2013.01); *F02N 11/04* (2013.01); *F02N 15/08* (2013.01);
(Continued)

(58) Field of Classification Search
CPC ...... F02N 15/02; F02N 15/022; F02N 15/025; F02N 15/08
See application file for complete search history.

(56) References Cited

U.S. PATENT DOCUMENTS 5,358,456 A * 10/1994 Deppert ................. F02B 67/04
                                                        475/154
5,418,400 A *  5/1995 Stockton ................ F02N 11/04
                                                        290/22
(Continued)

FOREIGN PATENT DOCUMENTS

DE    20 2016 100 742 U1    3/2016
FR         3012194 A1         4/2015
WO    WO 01/88369 A1        11/2001

*Primary Examiner* — Kevin R Steckbauer
(74) *Attorney, Agent, or Firm* — Foley & Lardner LLP

(57) ABSTRACT

A starting strategy for a power train of a motor vehicle including an internal combustion engine fitted with a drive shaft extending along a longitudinal axis, an alternator-starter, a first pulley that is designed to be driven in rotation by the drive shaft, a pulley that is rigidly connected to a shaft of the alternator-starter, a belt encircling said two pulleys, and a coupling/decoupling system between the first pulley and the drive shaft of the engine, characterized in that the starting strategy includes a preparation procedure for said belt in cold weather.

10 Claims, 4 Drawing Sheets

(51) Int. Cl.
  *F02N 15/08* (2006.01)
  *F02B 67/06* (2006.01)
  *F16H 7/00* (2006.01)
  *F16H 9/26* (2006.01)
  *F02N 11/08* (2006.01)
  *B60K 6/26* (2007.10)
  *F16H 7/02* (2006.01)

(52) U.S. Cl.
  CPC ............ *F16H 7/00* (2013.01); *F16H 9/26* (2013.01); *B60K 6/26* (2013.01); *F02N 11/0814* (2013.01); *F02N 2200/122* (2013.01); *F16H 7/02* (2013.01)

(56) References Cited

U.S. PATENT DOCUMENTS

| | | | | |
|---|---|---|---|---|
| 6,832,970 B2* | 12/2004 | Eibler | ............... | F02N 11/04 475/175 |
| 7,779,943 B2* | 8/2010 | Seidel | ............... | B60K 6/48 180/65.29 |
| 8,292,768 B2* | 10/2012 | Noboru | ............... | F02N 15/08 180/53.8 |
| 8,317,652 B2* | 11/2012 | Hladun | ............... | F02N 11/006 180/53.8 |
| 8,517,889 B2* | 8/2013 | Misala | ............... | F16D 27/004 475/322 |
| 8,727,944 B2* | 5/2014 | Noboru | ............... | F02N 15/08 180/53.8 |
| 8,882,633 B2* | 11/2014 | Misala | ............... | H02K 7/116 477/5 |
| 9,163,600 B2* | 10/2015 | Neet | ............... | F02N 11/04 |
| 9,169,904 B2* | 10/2015 | Graves | ............... | B60K 25/02 |
| 9,261,064 B2* | 2/2016 | Patel | ............... | F02N 11/04 |
| 9,284,994 B2* | 3/2016 | Williams | ............... | B60K 25/02 |
| 10,378,620 B2* | 8/2019 | Tran | ............... | F16D 47/04 |
| 2004/0038769 A1* | 2/2004 | Eibler | ............... | F02N 11/04 475/313 |
| 2010/0084211 A1* | 4/2010 | Seidel | ............... | B60K 6/48 180/294 |
| 2014/0361536 A1* | 12/2014 | Neet | ............... | B60W 10/08 290/31 |
| 2015/0377203 A1* | 12/2015 | Neet | ............... | H02M 7/44 290/31 |
| 2019/0077405 A1* | 3/2019 | Millon | ............... | B60W 30/194 |

* cited by examiner

Figure 1:
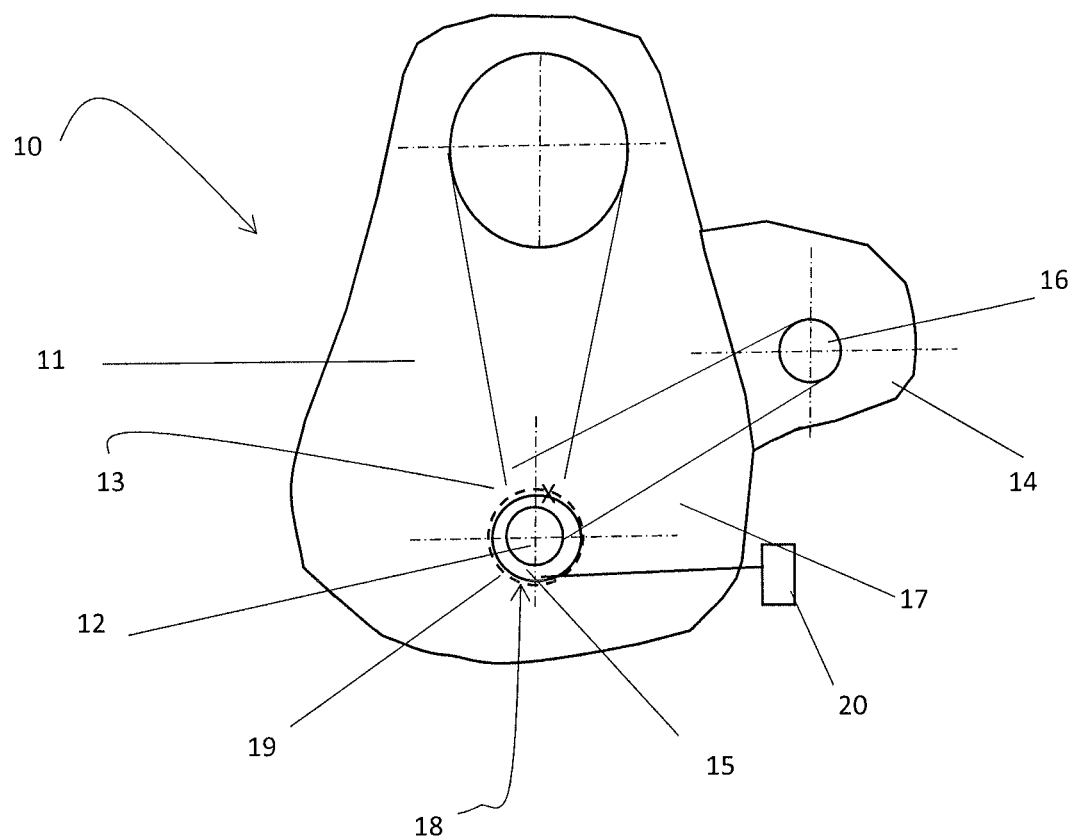

[Fig. 1]

COLD-WEATHER STARTING STRATEGY USING AN ALTERNATOR-STARTER IN A VEHICLE HAVING A BELT DRIVEN BY AN INTERNAL COMBUSTION ENGINE

TECHNICAL FIELD OF THE INVENTION

The present invention concerns a power train of a motor vehicle.

More specifically, the present invention concerns a power train having a transmission system with an alternator-starter. The present invention is used in, but is not limited to, stop-start systems.

The present invention concerns a starting strategy for a power train with an alternator-starter for use in cold weather.

PRIOR ART

Power trains in motor vehicles include systems for automatic stopping and automatic restarting of the engine in the event of a temporary stoppage of the vehicle, in order to reduce the consumption of the engine. Indeed, said systems enable the engine to be stopped when the vehicle is stopped for at least a threshold duration or if the vehicle has been decelerating at very low speed for at least a threshold duration. The stopped engine is restarted automatically subsequently for example by pressing or releasing a control pedal.

Such systems that currently use an alternator-starter with a starter are known. The distinctive characteristic of the alternator-starter lies in the ability thereof to start the engine and to generate the electricity required on board the vehicle from the rotation of the engine.

The starter enables the engine to be started when cold and the alternator-starter enables the engine to be started when hot during automatic restarting phases following automatic stopping phases.

The solutions are intended to obviate the need for the starter by providing drive ratios between the combustion engine and the alternator-starter that enable the transmission of enough torque to enable cold starting without subsequently adversely affecting the electrical energy generation mode.

The publication FR3012194-A1 discloses a transmission system including an internal-combustion engine block fitted with a drive shaft extending along a longitudinal axis, an alternator-starter linked in rotation to the drive shaft, a first pulley arranged along the longitudinal axis of the drive shaft and mounted freely in rotation on the drive shaft, and a drive pulley of the alternator-starter that is linked to the first pulley by a belt. The low drive ratio between the pulley of the alternator-starter and the first pulley enables the engine to be driven at a speed that is much lower than the speed of the alternator-starter, which makes it possible to provide a high drive torque for the drive shaft and to overcome the significant levels of friction present at low temperatures.

One drawback of this system is the presence of impurities and ice or frost on the belt at low temperatures, which may result in said belt slipping during a starting phase of the combustion engine. This makes starting with an alternator-starter impossible at very low temperatures. This difficulty is particularly acute in engines with a high compression ratio, such as diesel engines, since this high ratio requires a high drive torque to start the engine.

BRIEF SUMMARY OF THE INVENTION

The purpose of the invention is to overcome these problems and one of the objects of the invention is a starting strategy for a power train of a motor vehicle comprising an internal combustion engine block equipped with a drive shaft extending along a longitudinal axis, an alternator-starter linked in rotation to the drive shaft, a first pulley that is moveable in rotation about the longitudinal axis of the drive shaft, a pulley that is constrained to rotate with the alternator-starter and that is linked to the first pulley by a belt, and a coupling/decoupling system between the first pulley and the drive shaft of the engine.

More specifically, the present invention concerns a starting strategy for said power train with the alternator-starter characterized in that the starting includes a preparation phase for the belt in cold weather before the engine is started.

Advantageously, the starting of said power train with the alternator-starter includes a preparation phase for the belt to clean said belt of impurities such as frost, ice and dust, and to ensure firstly an improved contact between the belt and the pulleys and secondly to bring said belt into an operational state.

According to other characteristics of the invention:

The cleaning phase includes the belt being driven by the alternator-starter.

Advantageously, the alternator-starter is actuated to drive the belt in rotation during the cleaning phase without stressing the combustion engine block. When in rotation, said belt can be cleared of impurities such as dust, frost or ice, and be brought to a temperature substantially close to a minimum operating temperature threshold.

The cleaning phase includes a decoupling of the first pulley attached to the drive shaft.

Advantageously, the cleaning phase includes a decoupling of the first pulley from the drive shaft of the engine, which reduces the frictional and resistance forces of the first pulley and facilitates operation of the alternator-starter to drive the belt.

The cleaning phase is preceded by a verification phase of the preparation conditions of the belt.

Advantageously, the cleaning phase is started when low temperature conditions are detected, said conditions potentially resulting in the formation of frost or ice on the belt, which may hinder starting of the combustion engine using the alternator-starter, in order to enhance electrical energy economy and to optimize consumption of the power train. The preparation phase of the belt is also started if no previous belt preparation phase has been started within the period of time less than a threshold duration.

The cleaning phase is followed by a timing phase.

Advantageously, the cleaning phase is followed by a timing phase to prepare the starting of the engine using the alternator-starter.

The timing phase includes a coupling of the belt, of the first pulley attached to the drive shaft and of the pulley of the alternator-starter.

Advantageously, the timing phase includes a recoupling step of the first pulley, of the pulley of the alternator-starter and of the belt before the engine can be started using the alternator-starter.

The timing phase includes stopping operation of the alternator-starter.

Advantageously, during the timing phase, the alternator-starter is stopped before the recoupling step of the pulleys and of the belt.

The timing phase includes an information procedure displayed on the dashboard of the vehicle.

Advantageously, the timing phase may include a driver information procedure displayed on the dashboard of the vehicle. This enables the driver to prepare to start the engine and the vehicle.

The timing phase precedes a starting phase of the engine using the alternator-starter.

Advantageously, the timing phase is between the cleaning phase and the starting of the engine. The timing and cleaning phases can therefore be started before the driver gets behind the wheel of the vehicle, for example when the doors are opened.

SHORT DESCRIPTION OF THE FIGURES

Figure 2:
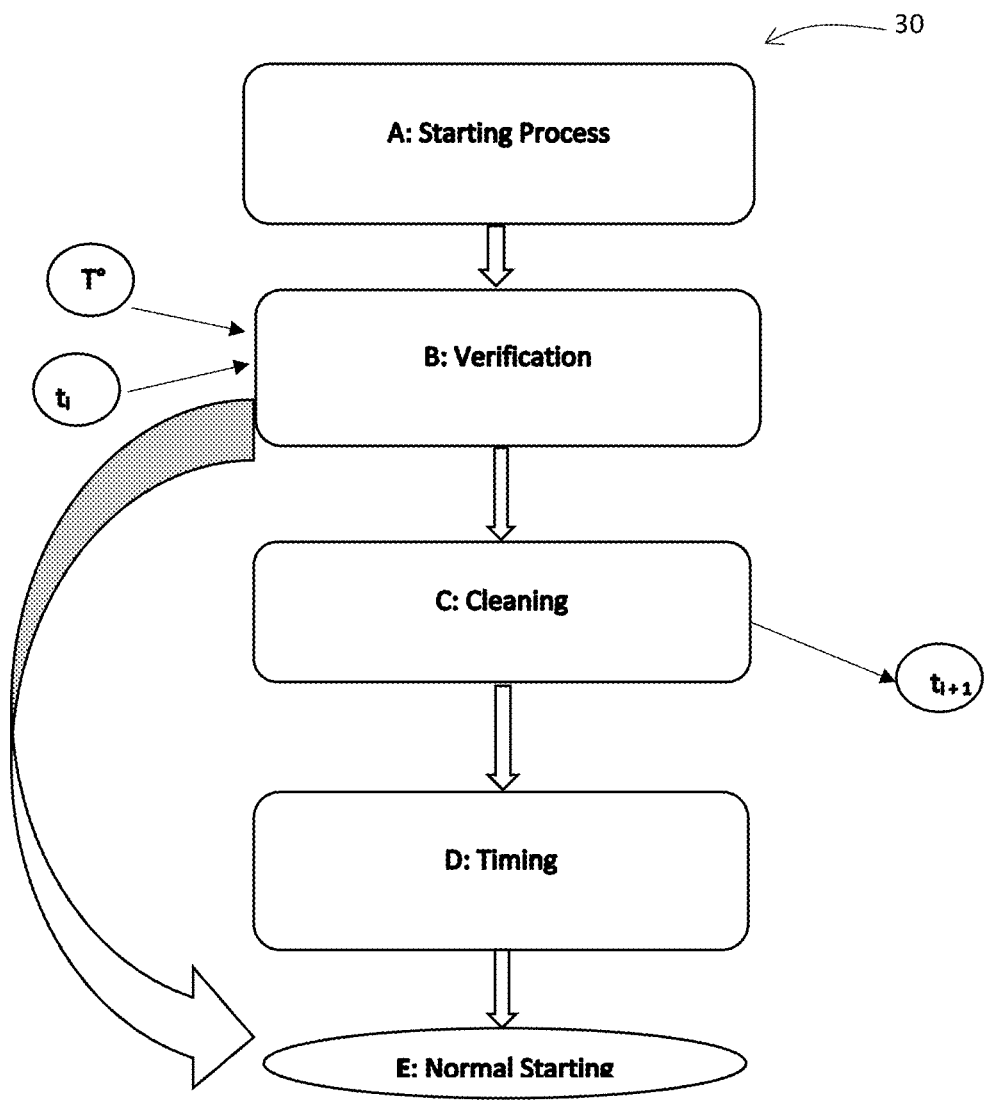
Figure 3:
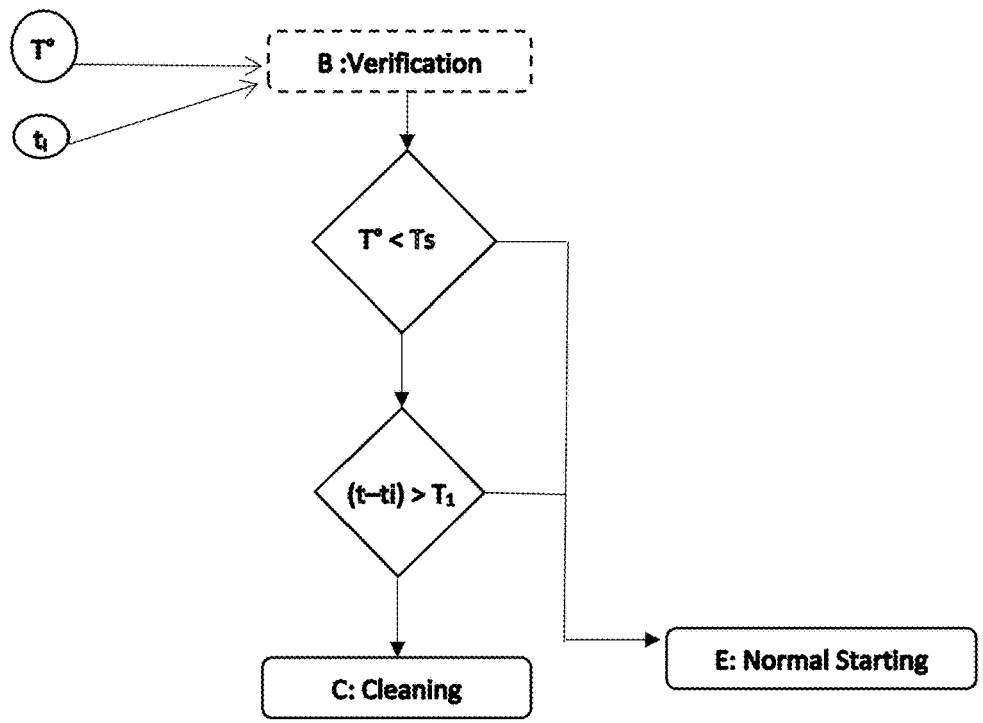
Figure 4:
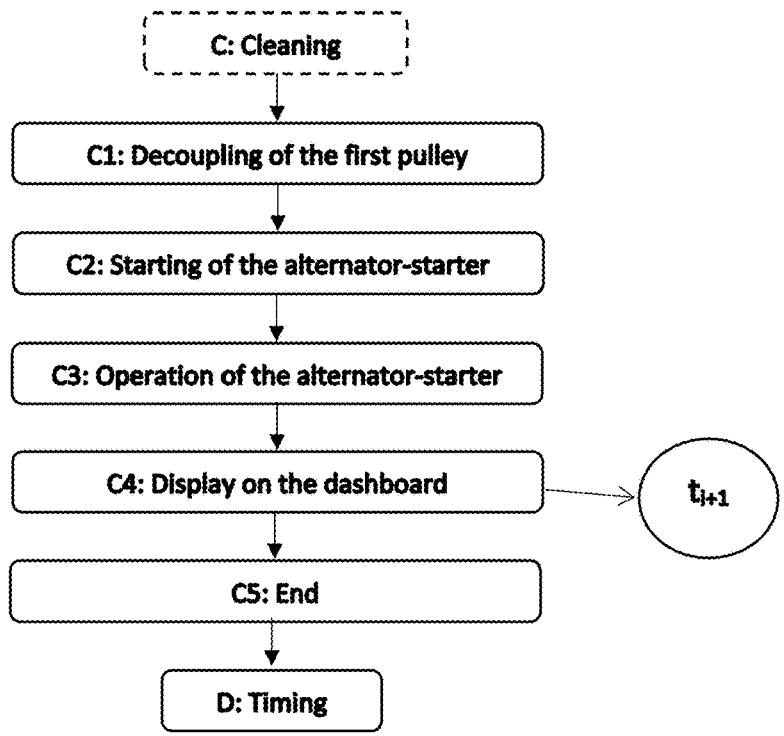
Figure 5:
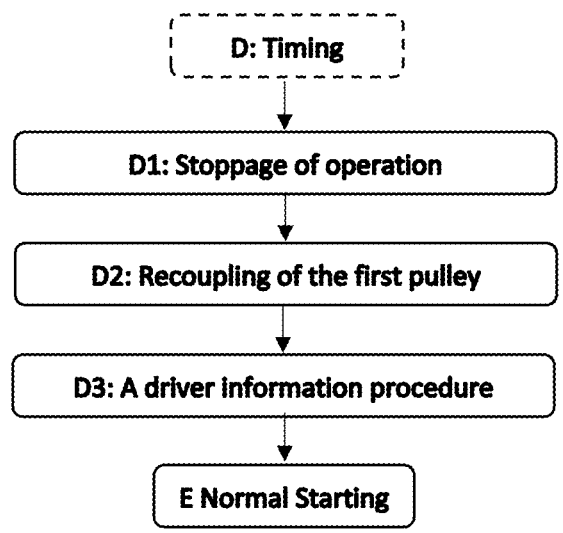

Other advantages and characteristics of the invention are set out in the following description of specific embodiments of the invention, which are provided as non-limiting examples and are shown on the attached drawings, in which:

FIG. 1 is a schematic representation of a power train fitted with an alternator-starter, FIG. 2 is a flow chart of the phases before the engine is started, FIG. 3 is a flow chart of the different steps of the verification phase, FIG. 4 is a flow chart of the different steps of the cleaning phase, FIG. 5 is a flow chart of the different functions of the timing phase,

DETAILED DESCRIPTION OF THE FIGURES

In the description below, identical reference signs refer to identical parts or parts having similar functions.

Thermal power trains of motor vehicles include an internal-combustion engine block with a starter and possibly an alternator-starter, for example for power trains including the automatic stop and restart function.

The distinctive characteristic of the alternator-starter lies in the ability thereof to perform the functions of two currently separate members: the starter, which is commonly positioned on the annulus gear of the engine and used to start the engine (as the name suggests) and the alternator, which is attached on the periphery of the engine and used to generate the electricity required on board the vehicle from the rotation of the engine. In the new layout, these two elements are replaced by a single element that performs both functions. The alternator-starter is in fact an alternator that has been modified to act as starter, in addition to the original function thereof.

The alternator-starter is mounted on the engine in place of the conventional alternator and, like the latter, is driven by the engine via a belt, as shown in FIG. 1. The alternator-starter includes a rotary shaft parallel to the longitudinal axis of the engine and the drive shaft of the engine, said shafts having coplanar pulleys encircled by the belt, at the same end of said shafts. The alternator-starter acts as an electricity generator on the same principle as a bicycle dynamo. However, the characteristic of the alternator-starter is the ability to operate in reversible mode: when powered by the battery, the alternator-starter acts as an electric motor to start the engine, via the same belt. The advantage of the alternator-starter is not so much in reducing the number of components used, but the improved performance levels achieved. The engine is started much quicker than with a conventional starter.

The fact that the transmission uses a toothed rubber belt means that the operation is also very quiet. In a conventional starter, the drive is provided by a metal pinion gear that drives a metal annulus gear, which is the source of the noise characterizing the starting of an engine. These two advantages make the starting of the engine practically imperceptible for the occupants of the vehicle.

The starter is usually positioned towards the top of the engine to prevent same from coming into contact with water, for example in the event of flooding or when crossing fords. Indeed, to restart a vehicle that has stopped in the middle of a ford, the starter needs to be positioned above the water level. As a result of new architectural constraints applicable to power trains, notably as a result of the arrangement of the high-pressure fuel supply pump towards the top of the engine, said starter can no longer be positioned towards the top of the engine.

It is therefore useful to do without the starter by providing drive ratios between the combustion engine and the alternator-starter that enable the transmission of enough torque to enable starting without subsequently adversely affecting the electrical energy generation mode, notably for colds starts in very cold conditions.

In a known manner, the use of an alternator-starter as a starter poses problems in the extreme cold, typically at temperatures T° outside the vehicle of less than −20° C., when frost or ice forms on the drive belt of the accessories. Said frost or said ice is liable to cause the belt to slip, during the starting phase of the combustion engine, on the coplanar pulleys rigidly connected to the alternator-starter and to the driveshaft of the engine, which may make starting using said alternator-starter very difficult or even impossible in very cold conditions. This difficulty is particularly acute in engines with a high compression ratio, such as diesel engines, since this high ratio requires a high drive torque to start the engine.

Dust may also be deposited on said belt and also cause said belt to slip.

According to the invention, a thermal power train 10 of a motor vehicle comprises an internal combustion engine 11 including a crankshaft that is extended at one end 13 by a drive shaft 12 extending along a longitudinal axis X of the engine, an alternator-starter 14 linked in rotation to the drive shaft, a first drive pulley 15 that is mounted moveably in rotation about the longitudinal axis X and that can be driven in rotation by the drive shaft, a pulley 16 of the alternator-starter that is constrained to rotate with the alternator-starter and linked to the first pulley by a belt 17, and a coupling/decoupling system 18 between the first pulley 15 and the drive shaft of the engine. Said belt thus encircles the first pulley 15 that is attached to one end of the driveshaft of the crankshaft at one end of said crankshaft and the pulley 16 of the alternator-starter 14.

According to the invention, the coupling/decoupling system 18 of the first pulley 15 at the end of the crankshaft with the pulley 16 of the alternator-starter and the belt 17 may include a switchable pulley 19. Said switchable pulley 19 is arranged at the end of the drive shaft instead of the first pulley 15 of the crankshaft. According to the invention, the belt 17 encircles the pulley 16 of the alternator-starter and the switchable pulley 19 attached to the end of the drive shaft of the crankshaft. The coupling/decoupling system enables the belt to be driven in two modes:

In decoupled mode, no significant forces are required since the link between the first switchable pulley 19 and the drive shaft 12 of the engine has been broken, and said switchable pulley is not constrained to rotate with the drive shaft of the crankshaft. The alternator-starter 14 is actuated in driving or starting mode to rotate the belt via the pulley of the alternator-starter and the first pulley 19, which is then disengaged and provides little or no resistance to rotation.

In coupled mode in which the first switchable pulley 19 is constrained to rotate with the drive shaft of the crankshaft. In a known manner, the alternator-starter can then be activated as a starter to drive the drive shaft 12 of the crankshaft or to provide additional torque to the engine 11, or as an alternator to generate electrical energy, the shaft of the alternator-starter then being driven in rotation by the drive shaft of the crankshaft. In normal operation, which is the coupled mode, the first pulley 19 is constrained to rotate with the drive shaft of the engine and is linked to the pulley 16 of the alternator-starter 14 and the belt 17. As a result, the first pulley 19 driven in rotation by the drive shaft 12 of the engine 11 can then rotate the pulley of the alternator-starter 14, which then works as an alternator, or the pulley 16 of the alternator-starter can drive the first drive pulley and the drive shaft of the engine when the combustion engine 11 is being started, said alternator-starter 14 then working as a starter.

In very cold conditions, to ensure good starting conditions, the coupling/decoupling system 18 is activated to position same in decoupled mode. The drive shaft 12 of the crankshaft is then no longer linked to the first switchable pulley 19 or to the alternator-starter 14. Said alternator-starter can then be started to drive the belt 17 in rotation. During such operation, the resistance to rotation is low and, by acting as a driving rotary machine, the alternator-starter requires little energy to rotate the belt only, with the first switchable pulley 19 freewheeling. The rotational speed is substantially great, firstly to clear said belt of impurities such as frost, ice or dust, and secondly to enable the temperature of this belt to be raised to a minimum operating temperature threshold. The temperature of the belt can be measured by measurement means or estimated as a function for example of a duration of rotation following a series of validation measurements. The coupling/decoupling system 18 then enables the recoupling of the first drive pulley 19 with the drive shaft of the engine to return to normal operation, preferably after a stoppage of the alternator-starter.

According to an embodiment that is not shown, the first switchable pulley 19 is held at one end of an intermediate shaft that has at least one tooth. Said tooth is part of a pinion gear and said intermediate shaft is linked in rotation to the drive shaft 12 of the engine by a gear wheel that meshes with the pinion gear. The belt 17 then encircles the first switchable pulley 19 and the pulley of the alternator-starter 14.

According to the invention, and as shown in FIG. 2, the starting of said power train includes a preparation procedure 30 of the belt with the following different phases:

a. A first phase A for starting the starting process of the power train. This first phase A can be triggered in different ways, for example when the doors are opened after an extended stoppage of the vehicle (the stoppage can be around one hour), or the positioning of the driver in the driver's seat, or on the engine start request signal.

b. A second verification phase B of the trigger conditions of the starting preparation procedure of the combustion engine. The verification phase takes account of cold outside temperatures. Cold temperature for example means any temperature below a minimum temperature threshold $T_S$ for example of at least −10° C. The outside temperature can be determined by an outside temperature probe, which is a device present in a known manner in a motor vehicle. The outside temperature value is sent to a control unit 20. If the outside temperature is:

B1. Greater than said minimum temperature threshold $T_S$, no action is taken and the procedure skips to the last phase E for normal starting of the engine 11 using the alternator-starter 14.

B2. Less than or equal to the minimum temperature threshold $T_S$, the subsequent phases for preparing starting in decoupled mode are triggered.

The verification phase B can include a verification step B3 to determine whether cleaning has been triggered recently. Said verification can be performed for example using a temporal signal $t_i$ written in the memory of the control unit 20. Said control unit can then check whether the time gap between the temporal signal and the instant of verification $(t-t_i)$ is greater than a fixed time threshold $T_1$, which may be in the order of a few minutes. If the gap is less than said time threshold $T_1$, there is no need to repeat the subsequent starting preparation phases and therefore to skip to phase E for starting under normal conditions using the alternator-starter 14 instead of a starter.

c. A cleaning phase C for the belt is shown in FIG. 3. This phase includes the following steps, as shown in FIG. 3:

C1. Decoupling of the first pulley. Said first pulley is then no longer linked to the drive shaft 11 of the engine and no longer offers any resistance to the drive provided by the belt.

C2. Starting of the alternator-starter in drive mode. Said alternator-starter is then able to rotate the belt 17 and the first pulley 19, which offers no resistance to the rotation.

C3. Operation of the alternator-starter in drive mode for a fixed duration Dt. Said duration can vary between a few seconds and one minute and can be set following validation tests. The pulley of the alternator-starter can for example rotate at the maximum speed or at about 10,000 revolutions per minute. When in movement, the belt is cleared of impurities such as dust, ice or frost and is brought up to temperature by heating in contact with the pulleys.

C4. Display on the dashboard of a preparation-to-start signal. This signal can be an LED illuminated on the driver's dashboard.

C5. The cleaning phase ends. A temporal signal $t_{i+1}$ is then written in the memory of the control unit, possibly replacing the previous temporal signal value.

d. A timing phase D shown in FIG. 4, which includes the following sequences:

D1. Stoppage of operation of the alternator-starter 14.

D2. Recoupling of the first pulley of the shaft of the crankshaft. Said recoupling is preferably carried out when the elements are immobilized.

D3. A driver information procedure involving display of a preparation-to-start verification signal on the dashboard. When the signal goes out, the driver can start the engine normally or the engine can be started automatically using the alternator-starter, if the start command signal has been given during phase A. The information procedure can be triggered at the beginning of phase D.

e. Phase E corresponds to starting under normal conditions using the alternator-starter instead of a starter.

The starting strategy according to the invention enables the combustion engine block to be started using the alternator-starter in good conditions, the belt being cleared of impurities such as dust, frost or ice and brought up to a sufficiently high operating temperature in relation to the temperature outside the vehicle.

Naturally, the invention is not limited solely to the embodiments described above by way of an example, but includes all possible variants. Notably, the coupling/decoupling system can differ from the one detailed in this description without thereby limiting the scope of the invention.

Notably, operation of the coupling/decoupling system can differ from that detailed in this description without thereby limiting the scope of the invention.

For example, the recoupling of the first pulley assembly with the drive shaft of the engine can be carried out without stopping the alternator-starter.

The invention claimed is:

1. A starting method for a power train of a motor vehicle including an internal combustion engine fitted with a drive shaft extending along a longitudinal axis, an alternator-starter, a first pulley configured to be driven in rotation by the drive shaft, a second pulley rigidly connected to a shaft of the alternator-starter, a belt encircling said two pulleys, and a coupling/decoupling system between the first pulley and the drive shaft of the engine, the starting method comprising:
   a preparation procedure for said belt in cold weather, the preparation procedure comprising a cleaning phase for the belt that includes:
      decoupling the first pulley from the drive shaft of the engine to prevent resistance to rotation, and
      operating the alternator-starter in drive mode for a set duration to drive the belt and the first pulley while the first pulley is decoupled from the drive shaft.

2. The starting method as claimed in claim 1, further comprising a verification phase of a set of trigger conditions for the preparation procedure, said trigger conditions include receiving a temperature measurement below a temperature threshold and measuring a time since the last cleaning of the belt above a time threshold.

3. The starting method as claimed in claim 1, wherein the preparation procedure includes a timing phase after the cleaning phase.

4. The starting method as claimed in claim 3, wherein the timing phase includes a coupling of the first pulley with the drive shaft of the engine.

5. The starting method as claimed in claim 3, wherein the timing phase includes a driver information procedure.

6. The starting method as claimed in claim 3, wherein the timing phase precedes a starting phase of the engine using the alternator-starter.

7. A power train of a motor vehicle comprising:
   an internal combustion engine fitted with a drive shaft extending along a longitudinal axis,
   an alternator-starter,
   a first pulley that is configured to be driven by the drive shaft,
   a second pulley that is rigidly connected to a shaft of the alternator-starter,
   a belt encircling said pulleys,
   a coupling/decoupling system between the first pulley and the drive shaft, and
   an electronic control unit configured to start said engine via a starting method including a preparation procedure for said belt in cold weather,
   the preparation procedure comprising a cleaning phase for the belt that comprises:
      decoupling the first pulley from the drive shaft of the engine to prevent resistance to rotation, and
      operating the alternator-starter in a drive mode for a set duration to drive the belt and the first pulley while the first pulley is decoupled from the drive shaft.

8. The power train as claimed in claim 7, wherein the first pulley comprises a switchable pulley.

9. The power train as claimed in claim 7, wherein the first pulley is held at the end of a shaft that is constrained to rotate with the drive shaft and that has a tooth.

10. The power train as claimed in claim 8, wherein the first switchable pulley is attached to and extends one end of the drive shaft.

* * * * *